US011640669B2

(12) United States Patent
Suzuki et al.

(10) Patent No.: US 11,640,669 B2
(45) Date of Patent: May 2, 2023

(54) MOTION ANALYSIS SYSTEM, MOTION ANALYSIS METHOD, AND COMPUTER-READABLE STORAGE MEDIUM

(71) Applicant: TENSOR CONSULTING CO. LTD., Tokyo (JP)

(72) Inventors: Haruya Suzuki, Tokyo (JP); Masamichi Kitagawa, Tokyo (JP); Takahisa Miyatake, Tokyo (JP); Koji Fujimoto, Tokyo (JP); Yuichi Tashiro, Tokyo (JP)

(73) Assignee: TENSOR CONSULTING CO. LTD., Tokyo (JP)

( * ) Notice: Subject to any disclaimer, the term of this patent is extended or adjusted under 35 U.S.C. 154(b) by 265 days.

(21) Appl. No.: 17/065,020

(22) Filed: Oct. 7, 2020

(65) Prior Publication Data

US 2021/0133987 A1    May 6, 2021

(30) Foreign Application Priority Data

Nov. 5, 2019   (JP) ............................. JP2019-200458

(51) Int. Cl.
*G06T 7/254* (2017.01)
*G06T 7/70* (2017.01)
*G06N 20/00* (2019.01)

(52) U.S. Cl.
CPC ............. *G06T 7/254* (2017.01); *G06N 20/00* (2019.01); *G06T 7/70* (2017.01);
(Continued)

(58) Field of Classification Search
CPC ....................... G06T 7/254; G06T 7/70; G06T 2207/10016; G06T 2207/20081;
(Continued)

(56) References Cited

U.S. PATENT DOCUMENTS

| 2013/0178304 | A1 | 7/2013 | Chan |
| 2019/0360177 | A1* | 11/2019 | Kiyota ................... G08G 1/166 |
| 2020/0051254 | A1* | 2/2020 | Habibian ............. G06N 3/0454 |

FOREIGN PATENT DOCUMENTS

| JP | 2003-117045 A | 4/2003 |
| JP | 2014-521139 A | 8/2014 |

(Continued)

*Primary Examiner* — Stephen P Coleman
(74) *Attorney, Agent, or Firm* — Oliff PLC

(57) ABSTRACT

A motion analysis system analyzing a prescribed motion performed by a person using a prescribed tool, with a prescribed portion of the person or portion of the tool in the motion being taken as a measurement portion, a predictive model generated by learning based on learning data including an image frame of a motion video, wherein the person performing the motion, and an inter-frame differential frame indicating a difference in pixel values between frames of each pixel of the image and an adjacent frames, which is adjacent to the image frame, in the motion video; generates an inter-frame differential frame of a given analysis object video; and predicts by using the predictive model a position of the measurement portion in an image frame of the analysis object video on the basis of the image frame of the analysis object video and the inter-frame differential frame of the analysis object video.

10 Claims, 8 Drawing Sheets

(52) U.S. Cl.
CPC ............... *G06T 2207/10016* (2013.01); *G06T 2207/20081* (2013.01); *G06T 2207/20224* (2013.01); *G06T 2207/30241* (2013.01)

(58) Field of Classification Search
CPC ........... G06T 2207/20224; G06T 2207/30241; G06T 2207/30196; G06T 2207/30221; G06N 20/00
USPC ........................................................ 382/100
See application file for complete search history.

(56) References Cited

FOREIGN PATENT DOCUMENTS

| | | |
|---|---|---|
| JP | 2018-26131 A | 2/2018 |
| JP | 2018-120402 A | 8/2018 |
| JP | WO2018-122956 A1 | 3/2019 |

\* cited by examiner

MOTION ANALYSIS SYSTEM, MOTION ANALYSIS METHOD, AND COMPUTER-READABLE STORAGE MEDIUM

CROSS-REFERENCE TO RELATED APPLICATIONS

This application is based upon and claims the benefit of priority from Japanese Patent Application No. 2019-200458 filed in Japan Patent Office on Nov. 5, 2019, the contents of which are hereby incorporated by reference.

BACKGROUND

The present disclosure relates to a technique for analyzing a motion performed by a person using a tool.

When practicing golf or selecting a golf club, it is effective to analyze a position or a trajectory of a specific location of a person or a golf club during a swing. For example, a position or a trajectory of a hand (grip) of a person gripping the golf club or a head of the golf club may be an analysis object.

Patent literature 1 discloses a technique for analyzing a video of a sport motion. Specifically, Japanese Translation of PCT Application No. 2014-521139 discloses a technique for calculating differences among a plurality of frames of a video displaying a motion performed in golf, analyzing the frame differences, and identifying a plurality of image frames that indicate primary positions during a swing motion. Japanese Translation of PCT Application No. 2014-521139 further describes using a rule-based model or a neural network when identifying a position of a golf club in an image frame or when identifying a primary position in a swing motion from a measured value of a frame difference.

Patent literature 2 discloses a motion analysis apparatus using a neural network. Specifically, time-sequential depth images (frames) of a moving image obtained by image-capturing a golf swing are input to a neural network in which output of a motion value quantitatively representing a motion of an object is implemented. A motion value obtained from the neural network is a value representing a rotational angle of the waist or shoulder or weight transfer of a golfer.

Patent literature discloses a swing-form diagnosis apparatus using an inter-frame difference. Specifically, frames relating to a course of swing motion performed by a subject are extracted as swing data and a specific motion point during a swing motion is determined based on an inter-frame difference using each frame in the swing data. The specific motion point is an important time point during a swing motion such as a moment of impact where a head of a golf club strikes a ball. In addition, Japanese Patent Application Publication No. 2003-117045 also describes an aspect of identifying a position of a club head in each frame and displaying a trajectory thereof by differential image processing.

Patent literature 4 discloses a sport motion analysis support system that uses a model representing a relationship between a motion in a time segment and a result corresponding to the motion. Specifically, a plurality of pieces of data, in which image data of a moving image representing a course of motion in sport and a result of the motion are associated with each other, are accumulated to learn a model that represents a relationship between a motion in a time segment and a result (a performance or a phenomenon) corresponding to the motion. When making a prediction using the model, a prediction accuracy thereof is calculated for each time segment. In this disclosure, an aspect is described, which adopts a carry as an example of a performance of golf and predicts a carry from a motion in each time segment of a golf swing. The phenomena include those relating to a movement of a tool used in sport.

Patent literature 5 discloses an event detection apparatus capable of learning a model for detecting an event in subframe units. Specifically, with respect to each frame, image feature information that expresses a feature of an image of each frame and features of images of an arbitrary number of consecutive frames before or after each of the frames is extracted, an image feature information sequence that corresponds to an image sequence that constitutes learning data is mapped to a low-dimensional space, and a model is learned by interpolating a space between respective mapped coordinates at prescribed time intervals.

(Patent literature 1) Japanese Translation of PCT Application No. 2014-521139
(Patent literature 2) Japanese Patent Application Publication No. 2018-26131
(Patent literature 3) Japanese Patent Application Publication No. 2003-117045
(Patent literature 4) Republished International Patent Publication No. WO 2018-122956
(Patent literature 5) Japanese Patent Application Publication No. 2018-120402

SUMMARY

As described above, Patent literatures each disclose a technique for analyzing image frames and differences between the image frames. However, none of these techniques are designed to analyze a motion performed by a person using a tool with a method that takes a relationship between the person and the tool into consideration.

An object of the present disclosure is to provide a technique that enables a prescribed motion performed by a person using a tool to be analyzed with a method suitable for analyzing the prescribed motion.

A motion analysis system according to an aspect of the present disclosure is a motion analysis system analyzing a prescribed motion performed by a person using a prescribed tool, wherein, with a prescribed portion of the person or a prescribed portion of the tool in the motion being taken as a measurement portion, a predictive model is stored, this predictive model being generated by learning based on learning data including an image frame of a motion video, in which the person is performing the motion, and an inter-frame differential frame indicating a difference in pixel values between frames of each pixel of the image frame and an adjacent frame, which is adjacent to the image frame, in the motion video, an inter-frame differential frame of a given analysis object video is generated, and, by using the predictive model, a position of the measurement portion in an image frame of the analysis object video is predicted on the basis of the image frame of the analysis object video and the inter-frame differential frame of the analysis object video.

According to an aspect of the present disclosure, a prescribed motion performed by a person using a tool can be analyzed with a method suitable for analyzing the prescribed motion.

DETAILED DESCRIPTION OF THE EMBODIMENT

Hereinafter, an embodiment of the present invention will be described with reference to the drawings.

Figure 1:
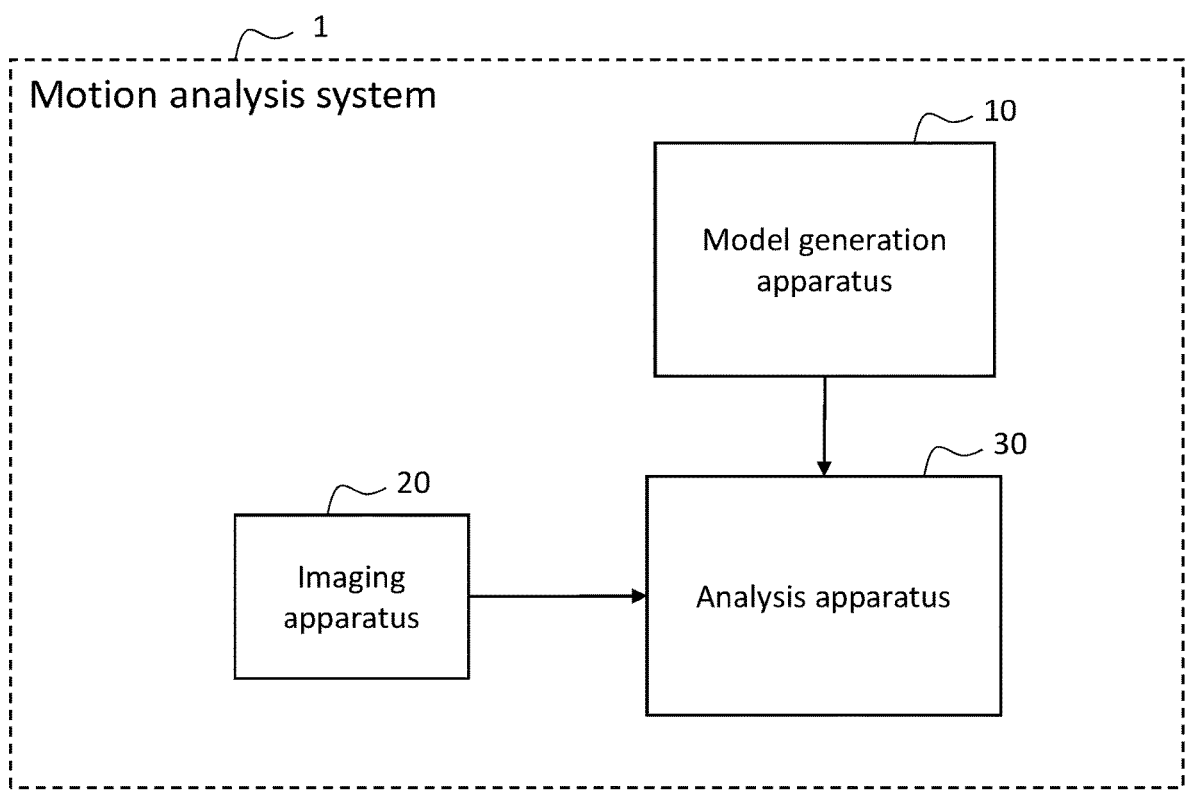
FIG. 1 is a block diagram of a motion analysis system according to the present embodiment.

FIG. 1 is a block diagram of a motion analysis system according to the present embodiment. Referring to FIG. 1, the motion analysis system 1 has a model generation apparatus 10, an imaging apparatus 20, and an analysis apparatus 30.

The motion analysis system 1 is a motion analysis system that analyzes a prescribed motion performed by a person using a prescribed tool and, specifically, a system that analyzes a swing motion performed by a person using a golf club.

The model generation apparatus 10 is an apparatus which performs learning by deep learning using a video of a swing motion performed by a person using a golf club as learning data and which generates a predictive model for measuring a position of a measurement portion from a video of a swing motion of a person to be an analysis object. For example, the model generation apparatus 10 can be realized by a computer that executes a software program stored in a storage apparatus with a processor. Specifically, the measurement portion is a head of the golf club.

The imaging apparatus 20 is an apparatus that image-captures a video of a swing motion of a person to be an analysis object. For example, the imaging apparatus 20 is a smartphone.

The analysis apparatus 30 is an apparatus which, using a predictive model generated by the model generation apparatus 10, analyzes a video that is an analysis object having been image-captured by the imaging apparatus 20 and measures a trajectory of the head and a position of the head at specific time point in a swing motion of a person. For example, the analysis apparatus 30 can be realized by a computer that executes a software program stored in a storage apparatus with a processor. Specifically, specific time points according to the present embodiment are an address time point, a take-back end time point, an impact time point, a finish time point, and an uppermost time point. However, the specific time points are not limited to these time points.

A swing motion includes a plurality of motion phases, namely, a take-back phase, a downswing phase, and a follow-through phase. The take-back phase is a motion phase in which the golf club is swung upward from a state where the head of the golf club is positioned near a ball. The downswing phase is a motion phase in which the golf club is swung downward after the take-back phase and the head strikes the ball. The follow-through phase is a motion phase in which the golf club is swung through after the downswing phase.

The address time point described above refers to a time point at which a take-back is started from a state where the golf club is being held with its head positioned with respect to a ball. The take-back end time point refers to a time point at which the take-back is reversed to a downswing. The impact time point refers to a time point at which the head of the golf club strikes the ball. The downswing is switched to a follow-through. The finish time point refers to a time point at which the follow-through ends. Since the address time point, the take-back end time point, the impact time point, and the finish time point are positioned on boundaries between the motion phases, hereinafter, the time points will also be referred to as phase boundary time points. The uppermost time point described above refers to a time point at which the head is at an uppermost position during the downswing from the take-back end time point. Since the uppermost time point is positioned in the middle of a motion phase, hereinafter, the uppermost time point is also referred to as an intraphase time point.

Figure 2:
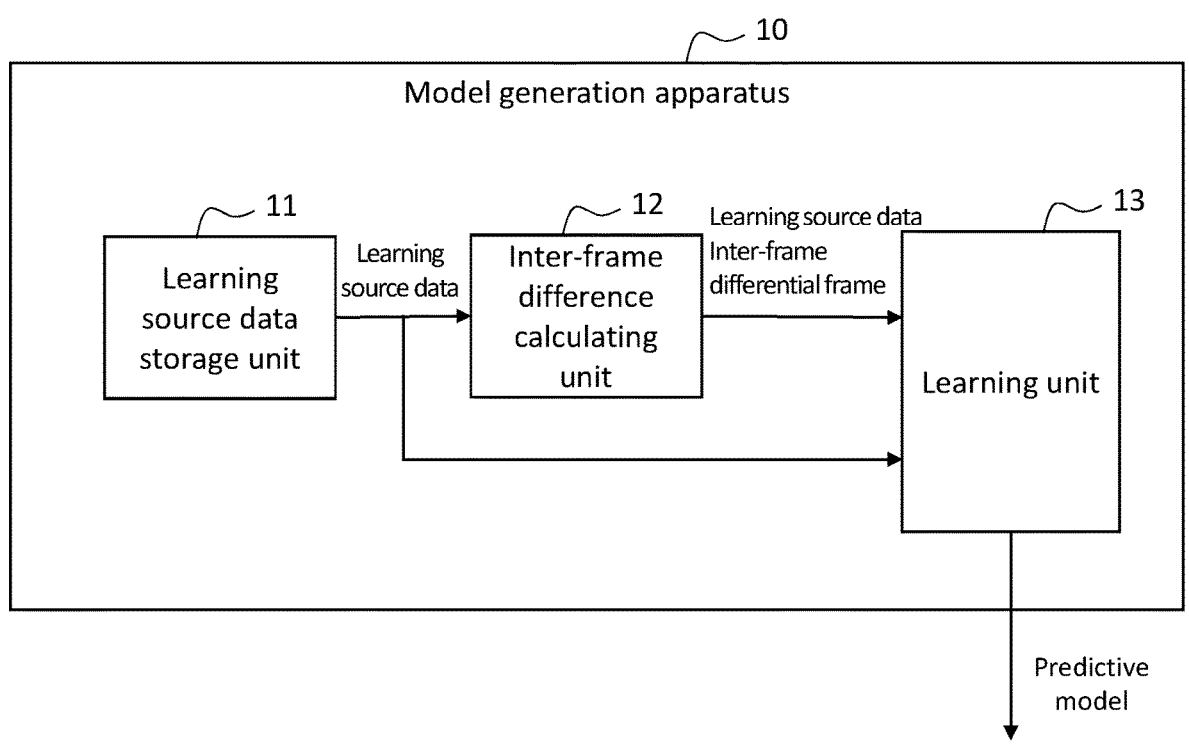
FIG. 2 is a block diagram of a model generation apparatus.

FIG. 2 is a block diagram of the model generation apparatus 10. The model generation apparatus 10 has a learning source data storage unit 11, an inter-frame difference calculating unit 12, and a learning unit 13. When the model generation apparatus 10 is realized by a computer, the learning source data storage unit 11 can be realized by a storage apparatus and the inter-frame difference calculating unit 12 and the learning unit 13 can be realized by a software program.

The learning source data storage unit 11 stores learning source data to be a source of learning data for generating a predictive model. Learning source data is video data of a prescribed motion that is performed by a person using a prescribed tool. Desirably, a large amount of data is collected as the learning source data. Video data is constituted by temporally consecutive image frames. In the present embodiment, image frames of the learning source data include an image frame of an R component, an image frame of a G component, and an image frame of a B component. As the learning source data, image frames in a time range during which the measurement portion is moving in the prescribed motion are used. Specifically, the learning source data is video data constituted by image frames in a time range during which the person is performing a swing motion using a golf club and during which the head of the golf club is moving.

The inter-frame difference calculating unit 12 generates, based on the learning source data, an inter-frame differential frame which distinguishes between a region with movement and a region without movement in each image frame of the learning source data and which displays the regions. The inter-frame difference calculating unit 12 calculates a difference in pixel values (for example, brightness values) of each pixel between two temporally consecutive frames in the learning source data and compares an absolute value of the difference with a prescribed threshold. In addition, the inter-frame difference calculating unit 12 distinguishes among the respective pixels of the image frame with a pixel of which an absolute value of the difference exceeds the threshold being considered a pixel with movement and a pixel of which an absolute value of the difference does not exceed the threshold being considered a pixel without movement, and generates an image frame displayed in binary as an inter-frame differential frame. Since a pixel of which an absolute value of the difference exceeds the threshold is a pixel with movement, it can be said that the number of pixels of which an absolute value of the difference exceeds the threshold indicates a motion amount of the image frame.

The learning unit 13 performs learning by deep learning using data that associates an image frame of the learning source data and an inter-frame differential frame of the learning source data with each other and generates a predictive model. The predictive model is presented to the analysis apparatus 30.

Figure 3:
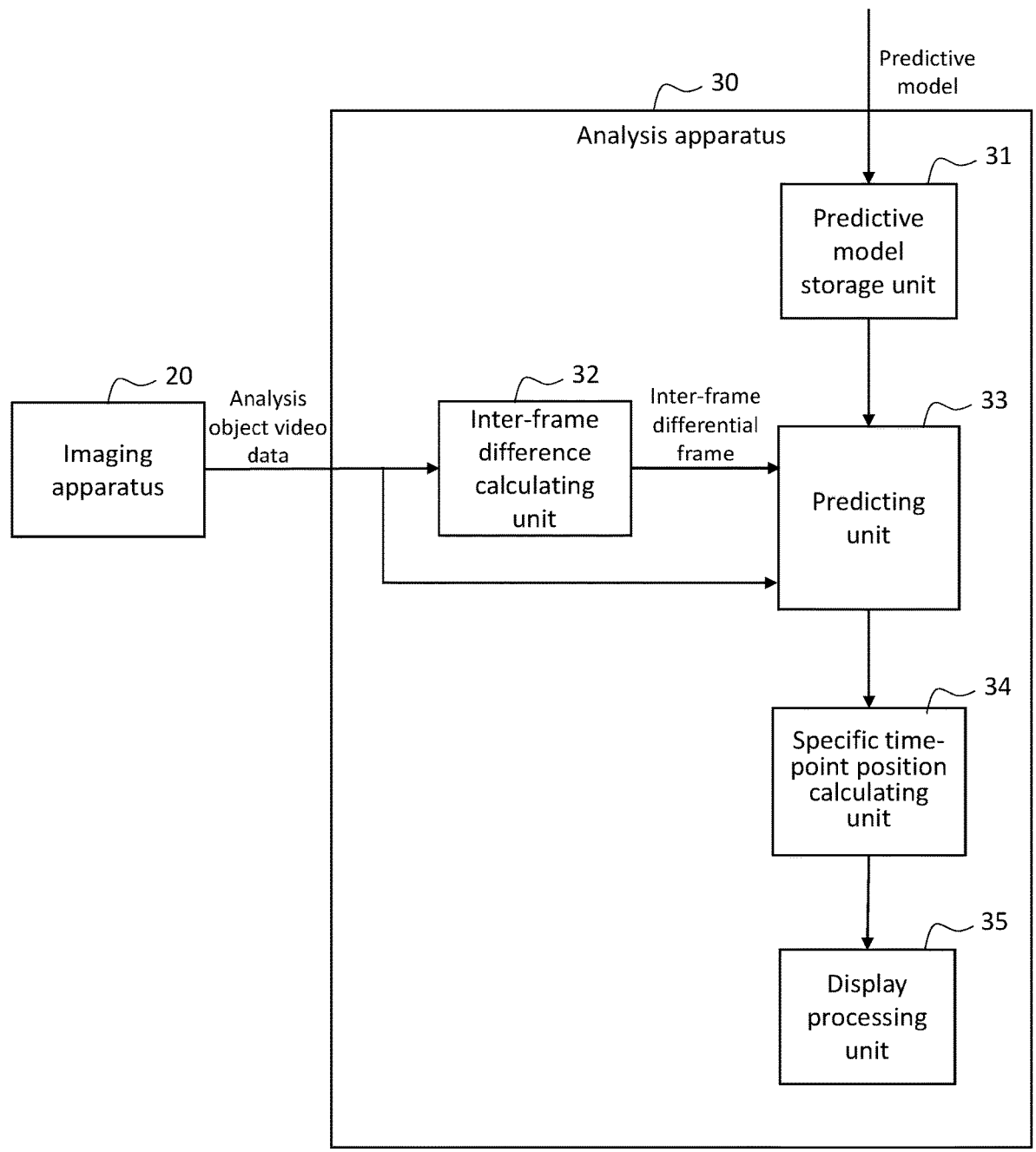
FIG. 3 is a block diagram of an analysis apparatus.

FIG. 3 is a block diagram of the analysis apparatus 30. The analysis apparatus 30 has a predictive model storage unit 31, an inter-frame difference calculating unit 32, a predicting unit 33, a specific time-point position calculating unit 34, and a display processing unit 35. When the analysis apparatus 30 is realized by a computer, the predictive model storage unit 31 can be realized by a storage apparatus and the inter-frame difference calculating unit 32, the predicting unit 33, the specific time-point position calculating unit 34, and the display processing unit 35 can be realized by a software program.

The predictive model storage unit 31 stores a predictive model generated by the model generation apparatus 10.

The inter-frame difference calculating unit 32 generates an inter-frame differential frame of analysis object video data supplied from the imaging apparatus 20. Analysis object video data according to the present embodiment includes, as image frames, an image frame of an R component, an image frame of a G component, and an image frame of a B component. Processing performed by the inter-frame difference calculating unit 32 with respect to analysis object video data is similar to the processing described earlier which is performed by the inter-frame difference calculating unit 12 with respect to learning source data. The inter-frame difference calculating unit 32 identifies a region with movement and a region without movement in image frames included in the analysis object video data and generates an image frame displayed in binary as an inter-frame differential frame.

Using the predictive model stored in the predictive model storage unit 31, the predicting unit 33 predicts a position of a head of a golf club in the image frame (including an image frame of an R component, an image frame of a G component, and an image frame of a B component) of the analysis object video based on the image frame of the analysis object video and the inter-frame differential frame of the analysis object video.

The specific time-point position calculating unit 34 calculates a position of the head of the golf club at a specific time point at which the head during a swing motion satisfies a prescribed condition. As described earlier, specific time points according to the present embodiment are an address time point, a take-back end time point, an impact time point, a finish time point, and an uppermost time point. In addition, the specific time-point position calculating unit 34 may interpolate a position of the head between image frames in the analysis object video with a spline curve and adopt a position on the spline curve that satisfies a prescribed condition as the position of the head at the specific time point. For example, the uppermost time point may be identified between an image frame and another image frame included in the analysis object video.

The display processing unit 35 displays, on a screen, a trajectory line that is a line tracing a trajectory of the head in the analysis object video and a marker that indicates, in a prescribed shape and color, a position of the measurement portion at a specific time point on the trajectory line. The screen may be provided in the analysis apparatus 30 itself or may be provided in another apparatus. For example, when the imaging apparatus 20 is a smartphone, the screen of the smartphone may be used.

Figure 4:
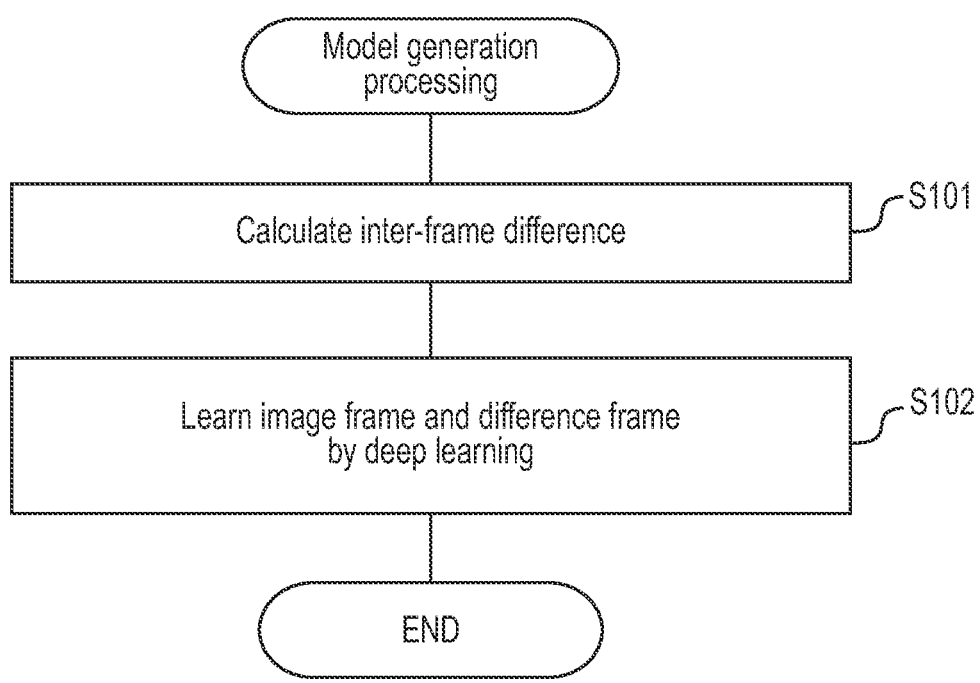
FIG. 4 is a flow chart of model generation processing.

FIG. 4 is a flow chart of model generation processing. Model generation processing is processing that is executed by the model generation apparatus 10.

Using the inter-frame difference calculating unit 12, the model generation apparatus 10 reads learning source data from the learning source data storage unit 11 and generates an inter-frame differential frame that corresponds to an image frame of the learning source data (step S101).

Next, using the learning unit 13, the model generation apparatus 10 performs learning by deep learning using image data of the learning source data and the inter-frame differential frame corresponding to the image data as learning data, and generates a predictive model (step S102).

Figure 5:
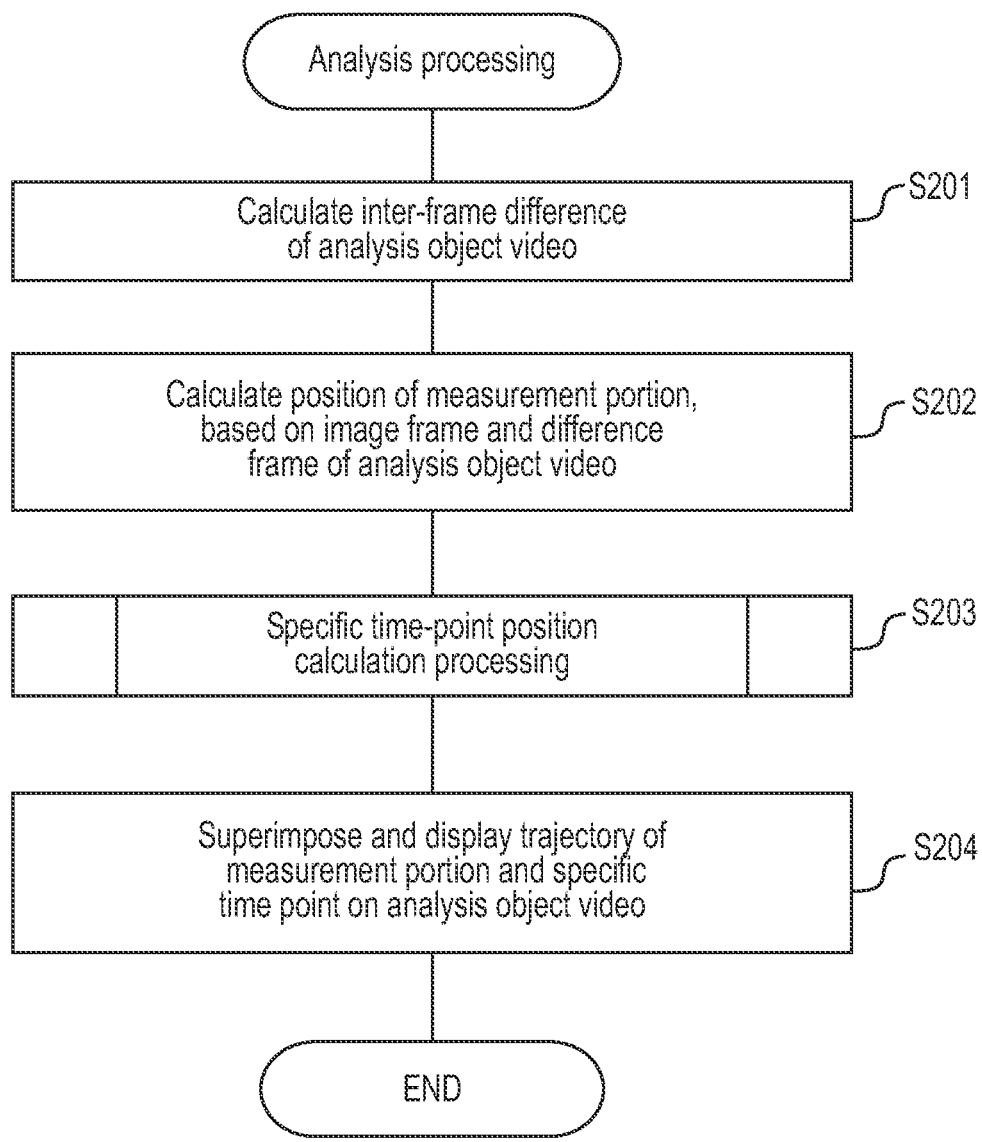
FIG. 5 is a flow chart of analytical processing.

FIG. 5 is a flow chart of analytical processing. Analytical processing is processing that is executed by the analysis apparatus 30.

Using the inter-frame difference calculating unit 32, the analysis apparatus 30 generates an inter-frame differential frame that corresponds to an image frame of analysis object video data supplied from the imaging apparatus 20 (step S201).

Next, using the predicting unit 33, the analysis apparatus 30 calculates a position of the head of the golf club in each image frame by inputting the image frame of the analysis object video data and the inter-frame differential frame corresponding to the image frame to the predictive model being recorded in the predictive model storage unit 31 (step S202).

Next, using the specific time-point position calculating unit 34, the analysis apparatus 30 executes specific time-point position calculation processing (step S203). Specific time-point position calculation processing is processing for calculating a specific time point in the analysis object video and a position of the head at the specific time point. Details of the specific time-point position calculation processing will be described later.

Next, the analysis apparatus 30 superimposes and displays a first marker that indicates the position of the head at the specific time point, a second marker that indicates the position of the head in each image frame, and a trajectory curve that indicates a trajectory of the head on the analysis object video or an image frame thereof (step S204).

Figure 6:
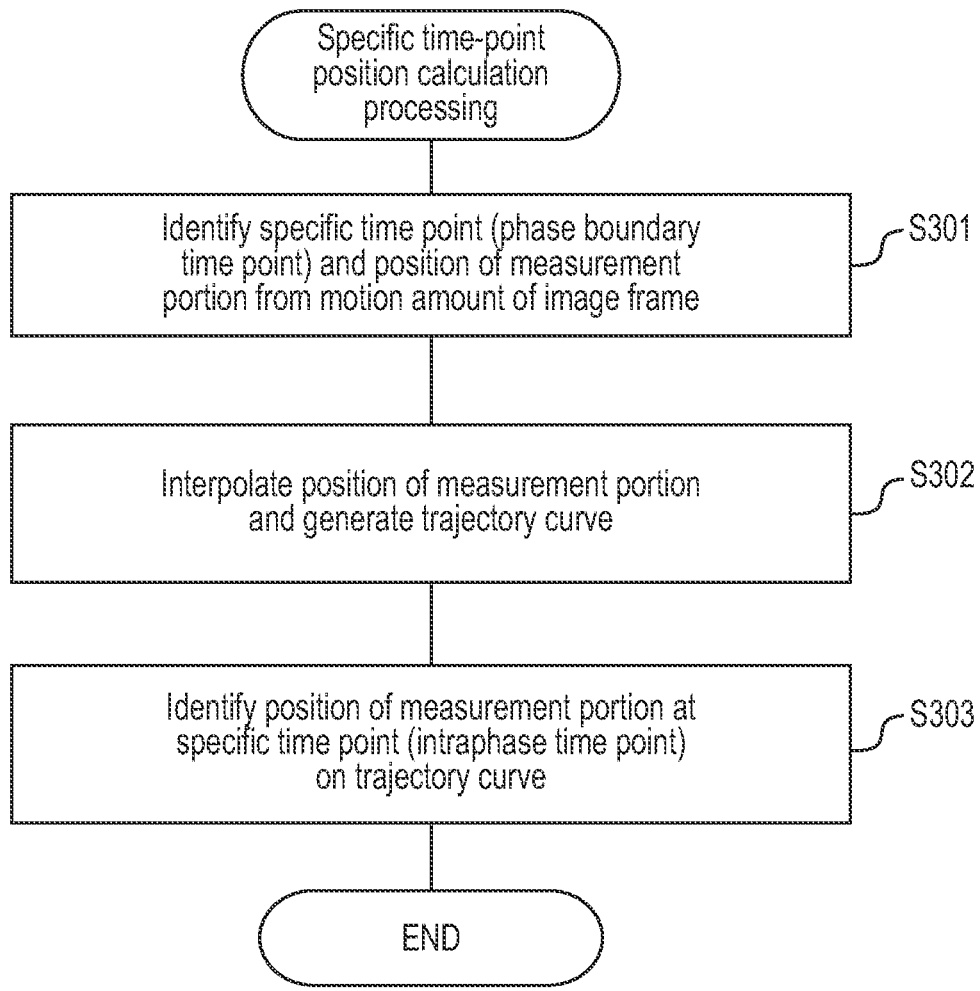
FIG. 6 is a flow chart of specific time-point position calculation processing.

FIG. 6 is a flow chart of specific time-point position calculation processing.

Using the specific time-point position calculating unit 34, the analysis apparatus 30 identifies a phase boundary time point and a position of the head at the phase boundary time point based on the number of pixels of which an absolute value of a difference in pixel values between each image frame and an adjacent frame of the analysis object video (a motion amount) exceeds a prescribed threshold (step S301). As described earlier, phase boundary time points are an address time point, a take-back end time point, an impact time point, and a finish time point among the specific time points.

Figure 7:
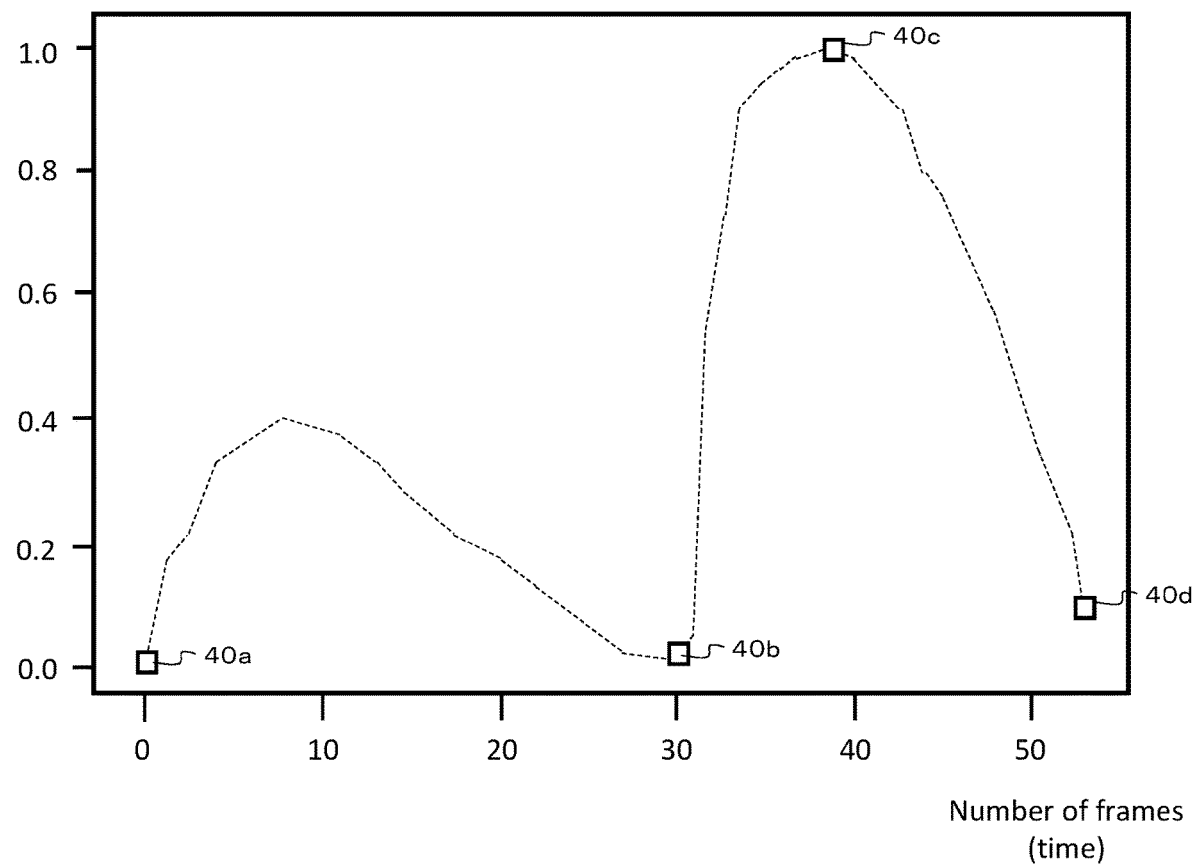
FIG. 7 is a graph showing an example of a transition of a motion amount during a swing motion.

FIG. 7 is a graph showing an example of a transition of a motion amount during a swing motion. An abscissa represents the number of frames of a video image-captured at 30 fps and corresponds to time. An ordinate represents a motion amount. The motion amount has been normalized so as to have a maximum value of 1. A phase boundary time point can be identified from a feature of a transition of the motion amount such as those shown in FIG. 7. For example, the motion amount is maximized at an impact time point 40c. At a take-back end time point 40b, since the head of the golf club is reversed due to a transition from a take-back to a swing, the motion amount is minimized and takes a value of 0 or close to 0. At an address time point 40a, the motion amount takes a value of 0 or close to 0 prior to the take-back end time point 40b. At a finish time point 40d, the motion amount takes a value of 0 or close to 0 after the impact time point 40c.

Next, using the specific time-point position calculating unit 34, the analysis apparatus 30 interpolates a position of the head in image frames in which the position of the head could not be identified and the position of the head between the frames (step S302).

Next, using the specific time-point position calculating unit 34, the analysis apparatus 30 identifies an intraphase time point and the position of the head at the intraphase time point based on the motion phase and a transition of the position of the head including interpolated positions (step S303).

As described earlier, the uppermost time point among the specific time points is an intraphase time point.

In addition, since a speed of the head is high at the impact time point, the impact time point identified based on the motion amount may not be accurate. For example, while any of the image frames is identified based on the motion amount as an image frame of the impact time point, there is a possibility that the actual impact time point may exist between an image frame and another. In consideration thereof, in the present embodiment, an impact time point is, firstly, once identified as a phase boundary time point and subsequently identified once again as an intraphase time point.

A specific processing example will now be described. First, the specific time-point position calculating unit 34 handles the impact time point as a phase boundary time point, identifies two consecutive image frames that maximize the motion amount, and divides a motion phase using a latter of the two image frames as a tentative impact time point. Accordingly, the actual impact time point is to exist at the tentative impact time point or a time point preceding the tentative impact time point or, in other words, within the downswing phase.

Next, the specific time-point position calculating unit 34 calculates a trajectory line by interpolating a position of the head between image frames. In addition, the specific time-point position calculating unit 34 handles the impact time point as an intraphase time point and adopts a lowermost point of the trajectory line in the downswing phase as the position of the head at the actual impact time point.

Accordingly, a specific time point at which the speed of the head is high can be identified with high accuracy without being dependent on a frame rate of the analysis object video.

Figure 8:
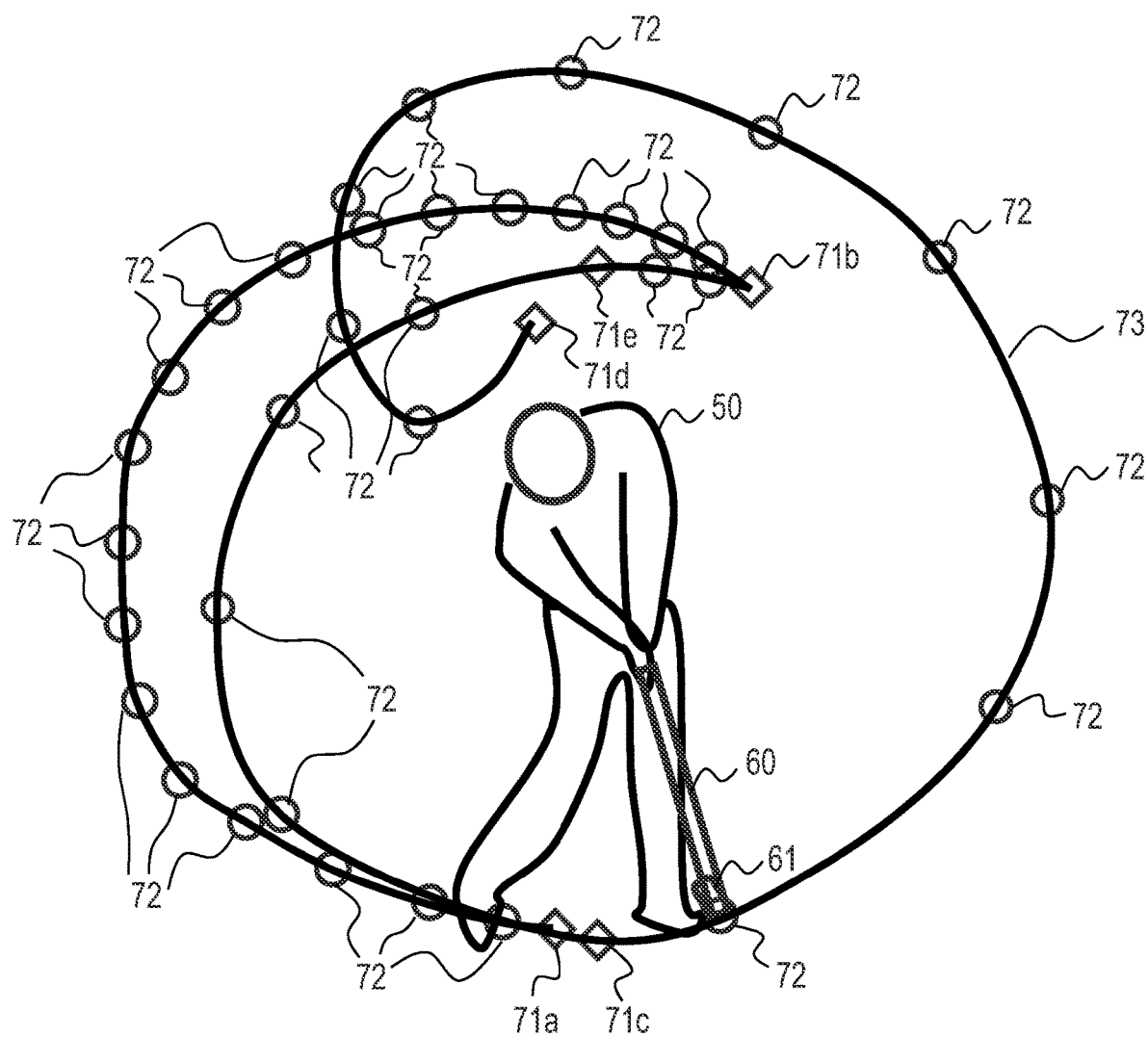
FIG. 8 is a diagram showing a display example of a screen.

FIG. 8 is a diagram showing a display example of the screen.

Referring to FIG. 8, a person 50, a golf club 60, a first marker 71, a second marker 72, and a trajectory curve 73 are displayed. The trajectory curve 73 indicates that, due to the person 50 performing a swing motion using the golf club 60 in an analysis object video, a head 61 of the golf club 60 has moved along the trajectory curve 73. The first marker 71 shows that the head 61 had been present at a position indicated by the first marker 71 at a specific time point. A first marker 71a indicates a position of the head 61 at the address time point. A first marker 71b indicates a position of the head 61 at the take-back end time point. A first marker 71c indicates a position of the head 61 at the impact time point. A first marker 71d indicates a position of the head 61 at the finish time point. A first marker 71e indicates a position of the head 61 at the uppermost time point. The second marker 72 indicates that the head 61 had been present at a position indicated by the second marker 72 in each image frame of the analysis object video.

The embodiment described above includes the configurations described below. However, it is to be understood that configurations included in the present embodiment are not limited to the following configurations.

First Configuration

A first configuration is a configuration in which a motion analysis system analyzes a prescribed motion performed by a person using a prescribed tool, the motion analysis system including: a predictive model storage unit configured to consider a prescribed portion of the person or a prescribed portion of the tool in the motion as a measurement portion, and to store a predictive model having been generated by learning based on learning data including an image frame of a motion video in which the person is performing the motion and an inter-frame differential frame indicating a difference in pixel values between frames of each pixel of the image frame and an adjacent frame that is adjacent to the image frame in the motion video; an inter-frame difference calculating unit configured to generate an inter-frame differential frame of a given analysis object video; and a prediction processing unit configured to predict, using the predictive model, a position of the measurement portion in an image frame of the analysis object video based on the image frame of the analysis object video and the inter-frame differential frame of the analysis object video. While the prescribed motion to be performed by the person is not particularly limited, an example of the prescribed motion is a swing motion of golf. The tool used when the person performs the prescribed motion has a feature in terms of shape. In addition, when the person performs the prescribed motion using the tool, the tool moves as a result of the action of the person and, conversely, when the tool moves, properties such as a shape, a weight, and flexibility of the tool affects the movement of the person. Therefore, when the person performs the prescribed motion using the tool, a mutual correlation is created between the movement of the person and the movement of the tool. The motion analysis method according to the present aspect takes these observations into consideration. In the motion analysis method according to the present aspect, by also using an inter-frame differential frame on which movements of both the person and the tool are reflected in addition to an image frame itself in which shapes of the person and the tool appear as learning data, a model that is suitable for analyzing a prescribed motion performed by the person using the tool can be generated as a predictive model for predicting a position of a measurement portion of the person or the tool in the image frame. As a result, a motion performed by a person using a tool can be analyzed with a method suitable for analyzing the motion.

Second Configuration

A second configuration is the first configuration described above, wherein the image frame included in the learning data is an image frame in a time range during which the measurement portion in the motion is moving.

Using only an image frame in a time range during which the measurement portion is moving as the image frame included in learning data enables a position of the measurement portion to be limited to a region in which an inter-frame difference is being created between image frames. By limiting the range in which the measurement portion may exist, a predictive model capable of accurately predicting the position of the measurement portion can be generated.

Third Configuration

A third configuration is the first configuration described above, further including a specific time-point position calculating unit configured to calculate a position of the measurement portion at a specific time point at which the measurement portion satisfies a prescribed condition in the motion.

Fourth Configuration

A fourth configuration is the third configuration described above, wherein the prescribed motion includes a plurality of motion phases which are temporally divided and which differ from one another, the specific time point includes a phase boundary time point that constitutes a boundary between the motion phases, and the specific time-point position calculating unit is configured to identify the phase boundary time point based on the number of pixels of which an absolute value of a difference in brightness values of the pixel between an image frame and an adjacent frame exceeds a prescribed threshold.

The number of pixels which is used in the present configuration and of which an absolute value of a difference in brightness values of the pixel between an image frame and an adjacent frame exceeds a prescribed threshold indicates an amount of movement (a motion amount) of an image. There is a property that a feature appears in the motion amount at a boundary between different motion phases. The present configuration focuses on this property and enables a phase boundary time point to be identified based on the number of pixels of which an absolute value of a difference in brightness values of the pixel between an image frame and an adjacent frame exceeds a prescribed threshold. For example, the take-back end time point can be identified by a condition requiring that the number of pixels of which an absolute value of a difference in brightness values exceeds a prescribed threshold is minimized and is equal to or smaller than the prescribed threshold.

Fifth Configuration

A fifth configuration is the fourth configuration described above, wherein the specific time point includes an intraphase time point at which a position of the measurement portion satisfies a prescribed condition in the motion phase, and the specific time-point position calculating unit is configured to identify the motion phase in the analysis object video based on the number of pixels of which an absolute value of a difference in brightness values of the pixel between an image frame and an adjacent frame exceeds a prescribed threshold and to identify the intraphase time point based on the motion phase and the position of the measurement portion.

For example, the uppermost time point refers to a time point at which the head is at an uppermost position during the downswing phase from the take-back end time point to the impact time point. The position of the head at the uppermost time point may approach the position of the head at the finish time point. Even in such a case, an intraphase time point can be identified according to the present aspect.

In particular, when a motion of reversing a movement direction of the measurement portion is included in the prescribed motion or when the measurement portion moves so as to trace a circle, a plurality of image frames with similar positions of the measurement portion may be contained in a video. In this case, it is difficult to identify the specific time point from the position of the measurement portion. In contrast, by separating the prescribed motion into a plurality of motion phases using a motion amount and identifying the specific time point based on the motion phases and positions of the head as in the present configuration, a plurality of specific time points at which the head is at similar positions can be individually identified.

Sixth Configuration

A sixth configuration is the fifth configuration described above, wherein the specific time-point position calculating unit is configured to interpolate a position of the measurement portion between image frames in the analysis object video with a spline curve, and based on the motion phase and the spline curve, adopt a position that satisfies the condition on the spline curve as a position of the measurement portion at the intraphase time point. According to the present configuration, since a space between image frames is interpolated and an intraphase time point is identified on the spline curve, a position of the measurement portion at a specific time point that exists between image frames can be accurately predicted.

Seventh Configuration

A seventh configuration is the sixth configuration described above, wherein the specific time-point position calculating unit is configured to interpolate, with the spline curve, a position of the measurement portion between the image frames and a position of the measurement portion in an image frame in which a position of the measurement portion could not be acquired.

Since the position of the measurement portion in an image frame in which the measurement portion had not been identified is interpolated, the position of the measurement portion that exists in the image frame in which the measurement portion cannot be acquired can now be predicted.

Eighth Configuration

An eighth configuration is the first configuration described above, wherein an image frame of the motion video and an image frame of the analysis object video include an image frame of an R component, an image frame of a G component, and an image frame of a B component.

Ninth Configuration

A ninth configuration is the third configuration described above, wherein the motion analysis system further includes a display processing unit configured to display, on a screen, a trajectory line that is a line tracing a trajectory of the measurement portion in the analysis object video and a marker that indicates, in a prescribed shape and color, a position of the measurement portion at the specific time point on the trajectory line.

The embodiment described above merely represents an example for illustrating the present invention, and it is to be understood that the scope of the present invention is not to be limited to the embodiment. It will be obvious to those skilled in the art that the present invention can be implemented in various other modes without departing from the scope of the present invention.

What is claimed is:

1. A motion analysis system analyzing a prescribed motion performed by a person using a prescribed tool, the motion analysis system comprising:
   a computer configured to perform:
      with a prescribed portion of the person or a prescribed portion of the tool in the motion being taken as a measurement portion, store a predictive model generated by learning based on learning data including:
         a plurality of image frames of a motion video, in which the person is performing the motion, and
         an inter-frame differential frame indicating a difference in pixel values between (i) each pixel in a first image frame of the plurality of image frames and (ii) each corresponding pixel in a second image frame of the plurality of image frames, the first image frame and the second image frame being temporally consecutive adjacent frames in the motion video;

generate the inter-frame differential frame for a given analysis object video based on whether an absolute value of the difference in pixel values in the analysis object video exceeds a predetermined threshold; and predict, using the predictive model, a position of the measurement portion in the analysis object video on the basis of the first and second image frames of the analysis object video and the inter-frame differential frame of the analysis object video.

2. The motion analysis system according to claim 1, wherein the plurality of image frames included in the learning data are each image frames in a time range during which the measurement portion in the motion is moving.

3. The motion analysis system according to claim 1, the computer further being configured to calculate a position of the measurement portion at a specific time point at which the measurement portion satisfies a prescribed condition in the motion.

4. The motion analysis system according to claim 3, wherein the computer is further configured to display, on a screen, a trajectory line that is a line tracing a trajectory of the measurement portion in the analysis object video and a marker that indicates, in a prescribed shape and color, a position on the trajectory line at which the measurement portion has been identified.

5. A motion analysis system analyzing a prescribed motion performed by a person using a prescribed tool, the motion analysis system comprising:
a computer configured to perform:
with a prescribed portion of the person or a prescribed portion of the tool in the motion being taken as a measurement portion, store a predictive model generated by learning based on learning data including:
an image frame of a motion video, in which the person is performing the motion, and
an inter-frame differential frame indicating a difference in pixel values between frames of each pixel of the image frame and an adjacent frame, which is adjacent to the image frame, in the motion video; and
predict, using the predictive model, a position of the measurement portion in an image frame of the analysis object video on the basis of the image frame of the analysis object video and the inter-frame differential frame of the analysis object video, wherein
the prescribed motion includes a plurality of motion phases which are temporally divided and which differ from one another,
the specific time point includes a phase boundary time point that constitutes a boundary between the motion phases, and
the specific time-point position calculating unit is configured to identify the phase boundary time point on the basis of the number of pixels, by which an absolute value of a difference in brightness values of the pixel between an image frame and an adjacent frame exceeds a prescribed threshold.

6. The motion analysis system according to claim 5, wherein
the specific time point includes an intraphase time point at which a position of the measurement portion satisfies a prescribed condition in the motion phase, and
the computer is further configured to identify the motion phase in the analysis object video on the basis of the number of pixels, by which an absolute value of a difference in brightness values of the pixel between an image frame and an adjacent frame exceeds a prescribed threshold, and to identify the intraphase time point on the basis of the motion phase and the position of the measurement portion.

7. The motion analysis system according to claim 6, wherein the computer is further configured to interpolate, with a spline curve, a position of the measurement portion between image frames in the analysis object video, and, on the basis of the motion phase and the spline curve, take a position that satisfies the condition on the spline curve as a position of the measurement portion at the intraphase time point.

8. The motion analysis system according to claim 7, wherein the computer is further configured to interpolate, with the spline curve, a position of the measurement portion between the image frames and a position of the measurement portion in an image frame, in which a position of the measurement portion has not been acquired.

9. A motion analysis method for analyzing a prescribed motion performed by a person using a prescribed tool, the motion analysis method executing by a computer:
storing, with a prescribed portion of the person or a prescribed portion of the tool in the motion being taken as a measurement portion, a predictive model generated by learning based on learning data including:
a plurality of image frames of a motion video, in which the person is performing the motion, and
an inter-frame differential frame indicating a difference in pixel values between (i) each pixel in a first image frame of the plurality of image frames and (ii) each corresponding pixel in a second image frame of the plurality of image frames, the first image frame and the second image frame being temporally consecutive adjacent frames in the motion video;
generating the inter-frame differential frame for a given analysis object video based on whether an absolute value of the difference in pixel values in the analysis object video exceeds a predetermined threshold; and
predicting by using the predictive model a position of the measurement portion in the analysis object video on the basis of the first and second image frames of the analysis object video and the inter-frame differential frame of the analysis object video.

10. A non-transitory computer-readable storage medium storing a motion analysis program for analyzing a prescribed motion performed by a person using a prescribed tool,
the motion analysis program causing a computer to execute:
storing, with a prescribed portion of the person or a prescribed portion of the tool in the motion being taken as a measurement portion, a predictive model generated by learning based on learning data including:
a plurality of image frames of a motion video, in which the person is performing the motion, and
an inter-frame differential frame indicating a difference in pixel values between (i) each pixel in a first image frame of the plurality of image frames and (ii) each corresponding pixel in a second image frame of the plurality of image frames, the first image frame and the second image frame being temporally consecutive adjacent frames in the motion video;
generating the inter-frame differential frame for a given analysis object video based on whether an absolute value of the difference in pixel values in the analysis object video exceeds a predetermined threshold; and predicting by using the predictive model a position of the measurement portion in an image frame of the analysis object video on the basis of the first and second image frames of the analysis object video and the inter-frame differential frame of the analysis object video.

* * * * *